United States Patent Office 2,857,952
Patented Oct. 28, 1958

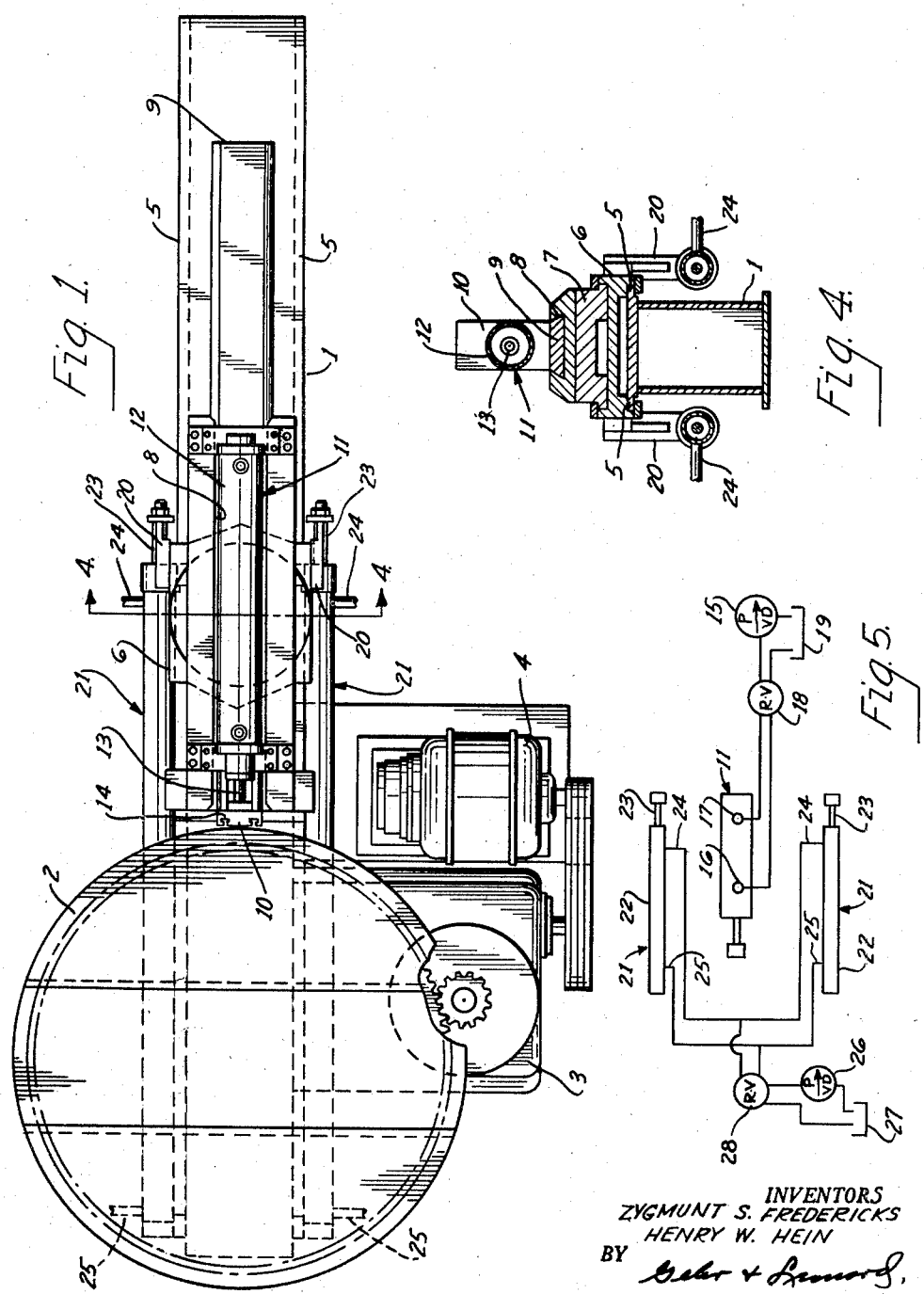

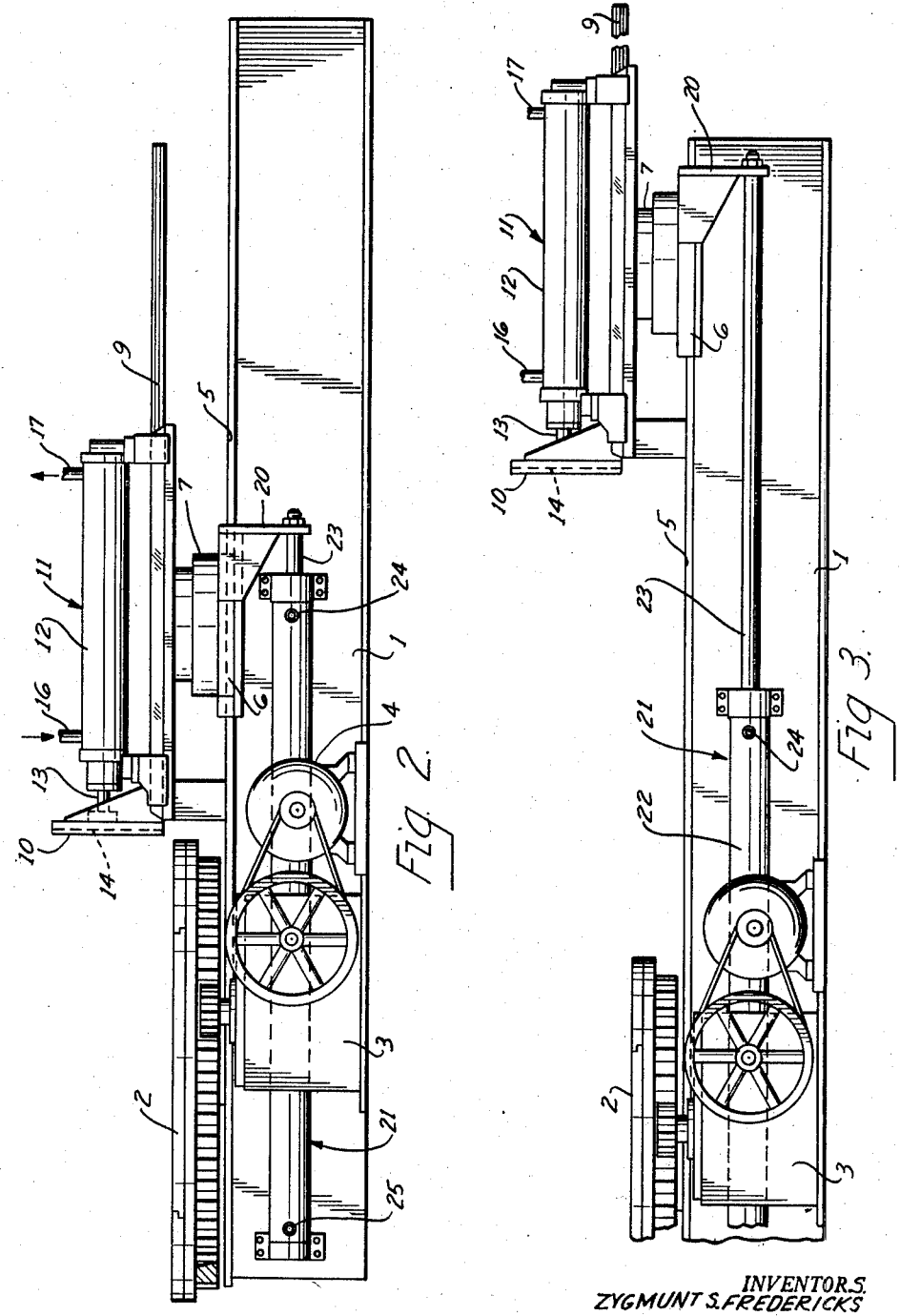

2,857,952

STRETCH FORMING APPARATUS WITH SUPPLEMENTAL PISTON AND CYLINDER ASSEMBLAGE

Henry W. Hein, Chardon, and Zygmunt S. Fredericks, Eastlake, Ohio, assignors to The Cyril Bath Company, Solon, Ohio, a corporation of Ohio Application February 1, 1956, Serial No. 562,786

4 Claims. (Cl. 153—40)

This invention relates to a metal forming machine for stretch forming lengths of metal stock and is an improvement on the metal forming machine disclosed in United States Letters Patent No. 2,713,376, issued July 19, 1955.

As disclosed in the above identified patent, it sometimes happens that the length of a strip of stock to be formed is so great that the length of stroke that would be required for the primary stretch forming piston and cylinder assemblage would be impracticable and it becomes necessary in such instances to provide some means which will permit the stretch forming of strips of stock of much greater length than the length of stroke of the stretch forming cylinder.

In some instances the need for a piston and cylinder assemblage having a greater stroke than the length of stock to be stretch formed is overcome by proper positioning of the side face die on the turntable of the machine so that, as the stock is stretch formed about the die, the instantaneous point of contact of the die moves progressively toward the stretch forming assemblage, thus relieving it to some extent from the necessity of becoming extended.

It does happen in some instances that this offsetting manipulation is not adequate and some supplemental means must be provided for moving the entire primary stretch forming piston and cylinder assemblage toward and away from the side face die.

In the structure disclosed in the above patent this is accomplished by providing a carriage for the primary stretch forming piston and cylinder assemblage and mounting the carriage on the frame of the machine so it can move with the assemblage toward and away from the turntable of the machine, the carriage in turn being connected to a supplemental piston and cylinder assemblage arranged at the opposite side of the carriage from the turntable and with its axis parallel to and midway between the guideways for the carriage so as to exert pull on the carriage in a direction away from the turntable.

The present invention is an improvement on the arrangement disclosed in the above identified patent.

Various objects and advantages of the present invention will become apparent in the following description, wherein reference is made to the drawings, in which:

Fig. 1 is a top plan view of a stretch forming machine embodying the principles of the present invention;

Figs. 2 and 3 are side elevations of the machine illustrated in Fig. 1 showing the supplemental piston and cylinder assemblages of the present invention in retracted and extended positions, respectively; and Fig. 4 is a cross-sectional view of the machine taken on the line 4—4 of Fig. 1; and Fig. 5 is a hydraulic flow diagram illustrating one manner of connecting the piston and cylinder assemblage for operation.

Referring to the drawings, the machine comprises a frame 1 on one end of which a turntable 2 is mounted for rotation about an upright axis. The turntable 2 is driven through the medium of a reversible adjustable speed transmission mechanism 3 by means of an electric motor 4.

The frame 1 is provided with suitable longitudinal guides 5 at its upper surface on which a carriage 6 is mounted for reciprocation therealong.

Mounted on the carriage 6 for rotation about an upright axis is a supporting turret 7 having an upwardly exposed horizontally extending guideway 8. In the guideway 8 is a slide 9 having at one end an upright pedestal 10, the slide 9 being reciprocable along the guideway 8. Mounted in fixed position on the turret 7 with its axis horizontally disposed is a primary stretch forming piston and cylinder assemblage 11 which includes a cylinder 12 and a piston having a piston rod 13. The rod 13 is fixedly connected to the pedestal 10.

As described in the above identified patent, the turntable is arranged to accommodate on its upper surface a suitable side face die and also some means for anchoring one end of a length of stock for rotation with the turntable and die. The pedestal 10 is provided with suitable T-shaped channels 14 by which a stretch forming head, for gripping the other end of the length of stock, may be connected to the pedestal.

The cylinder 12 is connected to a suitable source of pressure fluid, such as a variable delivery pump 15, and a sump by means of conduits 16 and 17, respectively, the conduit 16 being connected to the cylinder 12 at the rod side of the piston and the conduit 17 being connected to the cylinder at the opposite side of the piston. A suitable reversing valve 18 may be provided and interconnect the pump 15 and sump 19 with the conduits 16 and 17 for simultaneously admitting pressure fluid through one of the conduits and for venting the other one of the conduits to the sump, and for reversing the connection.

Thus, assuming that the carriage 6 were held in fixed position lengthwise of the guide 5, and a strip of metal were connected to a side face die on the table and to a stretching head on the pedestal 10, upon rotation of the table to stretch form the stock about the die the piston rod 13 would be moved to extended position.

As mentioned, it may be that the pedestal 10 with the stretch forming head thereon must be moved under yielding restraint a greater distance from its starting position toward the table 2 than would be permitted by the full extended stroke of the primary stretch forming piston and cylinder assemblage 11. In the structure of the above identified patent this additional movement is obtained by providing a supplemental piston and cylinder assemblage on the frame in alignment transversely of the frame with the primary assemblage 11 so that the axis of the supplemental assemblage lies in a vertical plane defined by the axis of the turntable 2 and the axis of the turret 7.

Such an arrangement not only greatly extends the length of the machine but also sometimes requires the maximum extension of the supplemental piston and cylinder assemblage at a time when the primary assemblage is fully extended. The binding stresses resulting from this condition sometimes are quite excessive.

The arrangement of the present invention is such as to overcome these excessive stresses. Not only does the present invention provide an advantage in this regard, but also, by reducing the binding forces tending to resist movement of the carriage 6 along the guide 5, it makes it possible to keep the pull exerted on the stock by the primary assemblage 11 more nearly proportional to the total pressure exerted on the piston thereof.

Here it should be noted that the pull on the stock must overcome not only the force exerted by the pressure fluid on the piston of the assemblage 11 but also the frictional drag of the piston within the cylinder 12, of the slide 9, and of the carriage 6 on the guides 5. This frictional drag is increased as the piston rod 13 is extended, and is particularly severe when the angle of the assemblage 11 with the guide 5 is at a maximum. The overhang of the piston rod 13 and slide 9 when extended and at an angle to the guide 5 can become so great that the stock can be pulled apart without moving the piston of the assemblage 11 toward extended position.

In accordance with the present invention, the carriage 6 is provided with gussets 20 arranged one at each side of the frame 1 and as close as practical to the level of the guides 5. Arranged alongside opposite sides of the frame are duplicate supplemental piston and cylinder assemblages 21, each of which comprises a cylinder 22 and a piston having a rod 23.

Each cylinder 22 is disposed with its head end adjacent that end of the frame which is on the opposite side of the axis of the table from the piston and cylinder assemblage 11 and with the rod end on the same side of the axis of the table as the assemblage 11.

The piston rods 23 are connected to the gussets 20, respectively, and suitable conduits 24 and 25 are provided on each cylinder 22 for admitting pressure fluid to opposite ends thereof. The conduits 24 and 25 may be connected to a suitable source of pressure fluid, such as a variable delivery pump 26, and to a sump 27, respectively, through a reversible valve 28. The cylinders 22 may be connected in the hydraulic circuit disclosed in the above identified patent, or they may be arranged for independent manual control.

Regardless of the means of control, it is generally desirable to operate the supplemental assemblages 21 first and then the main piston and cylinder assemblage 11 as the binding stresses are less when the assemblage 11 is retracted than when it is extended.

In the operation, assuming the piece of stock is to be stretch formed in accordance with the preferred procedure, the pressure in the assemblages 21 urging the carriage 6 away from the turntable 2 is set sufficiently less than that in the assemblage 11 urging the piston thereof to retracted position, so that, even with the frictional drag imposed by the carriage 6, there is less resistance to retracting the pistons of the assemblages 21 than to extension of the piston of the assemblage 11. Accordingly, as the piece is being stretch formed about a side face die on the turntable, the assemblages 21 first operate, allowing the entire primary assemblage 11 with its turret 7 and carriage 6 to approach the turntable 2 to the point desired and after the assemblages 21 have operated, the primary assemblage 11 can be operated to allow further extension of the assemblage 11 and movement of the pedestal 10 additionally toward the turntable 2. Thus the overhang of the piston rod 13 and slide 9 is at a minimum during operation of the assemblages 21.

Generally the angularity of the assemblage 11 relative to the guides 5 is less the farther the assemblage is from the turntable. Consequently, by operating the assemblages 21 first the frictional drag of the carriage 6 due to side thrusts and binding of the laterally overhanging assemblage 11 is at its least during the initial operation of the assemblages 21.

Again, due to the great length of the piston rods 23, the resultant overbalance and binding stresses and frictional drag of the rods and their pistons on the cylinders, their resistance to movement is less when they are in retracted than when they are in extended positions. By arranging them as described, in which case they start in fully extended position, their resistance to movement is reduced progressively to a minimum during the stretch forming operation because they are then being retracted. This reduction of resistance in the assemblages 21 occurs as the resistance, due to increased angularity of the assemblage 11, as it approaches the turntable 2, increases. Thus the decrease in resistance of the assemblages 21 tends to offset the increase in resistance due to the angularity of the assemblage 11. Furthermore, the reduction in the resistance of the assemblages 21 decreases to a minimum before the extension of the assemblage 11 with accompanying increased resistance due to overhang of the piston rod 13 and slide 9 of the assemblage 11. In this manner the resistance of the assemblages 21 relative to that of the assemblage 11 is somewhat offsetting, whereas in the structure illustrated in the above identified patent, the resistance of the supplemental assemblage becomes increasingly great, due to its extension as that of the primary assemblage 11 and carriage becomes increasingly great.

By offsetting the resultant stresses in this manner by the reverse arrangement of the assemblages 21 reduces the frictional resistance imposed by the various working parts relative to what it was in the above identified patent.

Having thus described our invention, we claim:

1. In a stretch forming machine of the character described and comprising a base, a power driven rotatable turntable on the base and adapted to support a side face die and to support means for connecting one end of a length of a stock for rotation with the die and turntable, a carriage mounted on the base for travel toward and away from the turntable along a predetermined path, a primary stretch forming piston and cylinder assemblage mounted on the carriage for travel therewith and with the piston axis extending generally toward and away from the turntable in a plane generally normal to the axis of rotation of the turntable, said piston being adapted to be operatively connected to a stretch forming head for movement of the head therewith and for connecting the other end of the length of stock to be formed to the piston, a supplemental stretch forming piston and cylinder assemblage means including at least one cylinder, mounted on the base with at least the major portion of the length of the cylinder located along a portion of the base which, in the closest position of the carriage relative to the turntable, is at the same end of the carriage as the turntable, with its axis parallel to the carriage path, and with a piston in the cylinder connected to the carriage in a position such that it is moved toward retracted position as the carriage is moved toward the turntable and to extended position as the carriage is moved away from the turntable, means to supply pressure fluid to the primary assemblage so as to yieldably resist movement of the piston thereof toward extended position, and means to supply pressure fluid to the assemblage means so as to yieldably resist movement of the piston thereof toward retracted positions, whereby both pistons are operable to yieldably resist movement of the stretch forming head toward the table.

2. A stretch forming machine according to claim 1 characterized in that said supplemental assemblage means are positioned endwise of the frame with the rod end of its said cylinder at the same side of the table axis as the carriage, and with the head end of its said cylinder at the opposite side of the table axis from the carriage.

3. A stretch forming machine according to claim 1 further including additional means whereby operation of the primary asesmblage can be effected in a predetermined controlled relation relative to the supplemental assemblage means, and said additional means being operable to effect operation of the supplemental assemblage means to substantially fully retracted position prior to extension of the primary assemblage.

4. In a stretch forming machine of the character described and comprising a base, a power driven rotatable turntable on the base and adapted to support a side face die and to support means for connecting one end of a length of stock for rotation with the die and turntable, a carriage mounted on the base for travel toward and away from the turntable along a predetermined path, a primary stretch forming piston and cylinder assemblage mounted on the carriage for travel therewith and with the piston axis extending generally toward and away from the turntable in a plane generally normal to the axis of rotation of the turntable, said assemblage being adapted to be operatively connected to a stretch forming head for movement of the head thereby and for connecting the other end of the length of stock to be formed to the primary assemblage, a supplemental stretch forming piston and cylinder assemblage means including at least one cylinder member and one piston member, one of said members being mounted in fixed position on the base with at least the major portion of the length of the assemblage located along a portion of the base which, in the closest position of the carriage relative to the turntable, is at the same end of the carriage as the turntable, with its axis parallel to the carriage path, and with the other member connected to the carriage in a position such that the supplemental assemblage means is moved toward retracted position as the carriage is moved toward the turntable and to extended position as the carriage is moved away from the turntable, means to supply fluid pressure to the primary assemblage so as to yieldably resist movement thereof toward extended position, and means to supply pressure fluid to the supplemental assemblage means so as to yieldably resist movement of the assemblage means toward retracted position, whereby both the primary asesmblage and the assemblage means are operable to yieldably resist movement toward the table of a stretch forming head when such a head is connected to the primary asesmblage.

References Cited in the file of this patent

UNITED STATES PATENTS

| | | |
|---|---|---|
| 2,284,073 | Silven | May 26, 1942 |
| 2,713,376 | Bath | July 19, 1955 |